United States Patent
Kletsov et al.

(10) Patent No.: US 11,683,073 B2
(45) Date of Patent: Jun. 20, 2023

(54) HUMAN BODY COMMUNICATION APPARATUS FOR NEAR FIELD COMMUNICATION SIGNAL AND METHOD THEREOF

(71) Applicant: SAMSUNG ELECTRONICS CO., LTD., Suwon-si (KR)

(72) Inventors: Andrey Vladimirovich Kletsov, Moscow (RU); Alexander Gennadievich Chernokalov, Korolev (RU); Konstantin Aleksandrovich Pavlov, Moscow (RU); Artem Yurievich Nikishov, Kolomna (RU); Nikolay Nikolayevich Olyunin, Perm (RU); Kisoo Kim, Suwon-si (KR); Taeseon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/973,095

(22) PCT Filed: Aug. 9, 2019

(86) PCT No.: PCT/KR2019/010095
§ 371 (c)(1),
(2) Date: Dec. 8, 2020

(87) PCT Pub. No.: WO2020/032701
PCT Pub. Date: Feb. 13, 2020

(65) Prior Publication Data
US 2021/0258044 A1 Aug. 19, 2021

(30) Foreign Application Priority Data
Aug. 10, 2018 (RU) .......................... RU2018129261

(51) Int. Cl.
*H04B 5/00* (2006.01)

(52) U.S. Cl.
CPC ............ *H04B 5/005* (2013.01); *H04B 5/0012* (2013.01); *H04B 5/0031* (2013.01); *H04B 5/0056* (2013.01)

(58) Field of Classification Search
CPC .... H04B 5/005; H04B 5/0012; H04B 5/0031; H04B 5/0056
(Continued)

(56) References Cited

U.S. PATENT DOCUMENTS

| 5,796,827 A | 8/1998 | Coppersmith et al. |
| 7,664,476 B2 | 2/2010 | Yanagida |

(Continued)

FOREIGN PATENT DOCUMENTS

| EP | 2 071 664 A1 | 6/2009 |
| EP | 2 237 439 B1 | 7/2012 |

(Continued)

OTHER PUBLICATIONS

Communication dated Aug. 10, 2018 issued by the Russian Intellectual Property Office in counterpart Russian Application No. 2018129261.

(Continued)

*Primary Examiner* — Kevin M Burd
(74) *Attorney, Agent, or Firm* — Sughrue Mion, PLLC

(57) ABSTRACT

Provided is a human body communication (HBC) apparatus for a near field communication (NFC) signal, the HBC apparatus including: a first communicator configured to receive a first NFC signal from an NFC reader through a body in proximity to the body; and a second communicator configured to transmit a signal to a user device, wherein first data included in the first NFC signal received from the NFC reader through the body by the first communicator is transmitted to the user device by the second communicator.

19 Claims, 12 Drawing Sheets

(58) Field of Classification Search
USPC .......................................................... 375/256
See application file for complete search history.

(56) References Cited

U.S. PATENT DOCUMENTS

| | | | |
|---|---|---|---|
| 7,925,235 | B2 | 4/2011 | Konya et al. |
| 8,390,250 | B2 | 3/2013 | Washiro |
| 8,391,784 | B2 | 3/2013 | Washiro |
| 8,487,773 | B2 | 7/2013 | Kang et al. |
| 8,498,571 | B2 | 7/2013 | Washiro |
| 8,547,184 | B2 | 10/2013 | Washiro |
| 8,558,634 | B2 | 10/2013 | Washiro |
| 8,599,092 | B2 | 12/2013 | Washiro |
| 9,479,013 | B2 | 10/2016 | Joye et al. |
| 9,692,525 | B2 | 6/2017 | Konanur et al. |
| 10,321,406 | B2 * | 6/2019 | Bostick ................ H04W 4/023 |
| 10,721,606 | B2 | 7/2020 | Lee |
| 2009/0088114 | A1 | 4/2009 | Yoshida et al. |
| 2011/0228814 | A1 | 9/2011 | Washiro |
| 2014/0081087 | A1 | 3/2014 | Yu |
| 2015/0318933 | A1 | 11/2015 | Washiro et al. |
| 2016/0380703 | A1 * | 12/2016 | Konanur ............ G06K 7/10237 455/41.1 |
| 2017/0293740 | A1 | 10/2017 | Xing |
| 2019/0132059 | A1 * | 5/2019 | Tanaka .................. H04B 1/385 |

FOREIGN PATENT DOCUMENTS

| | | | |
|---|---|---|---|
| EP | 2 933 936 A1 | 10/2015 | |
| EP | 3493414 A1 * | 6/2019 | ........... H04B 13/005 |
| JP | 2015-028754 A | 2/2015 | |
| KR | 10-0911032 B1 | 8/2009 | |
| KR | 10-1378296 B1 | 3/2014 | |
| KR | 10-1627760 B1 | 6/2016 | |
| KR | 10-2018-0080044 A | 7/2018 | |
| RU | 2 649 907 C2 | 4/2018 | |
| WO | 2014/091806 A1 | 6/2014 | |
| WO | 2016/088456 A1 | 6/2016 | |

OTHER PUBLICATIONS

International Search Report dated Nov. 21, 2019 issued by the International Searching Authority in counterpart International Application No. PCT/KR2019/010095 (PCT/ISA/210).

Arvind Allawadi et al., "Touch-based Magnetic Communication through Your Hand", IEEE Computer Society, DOI: 10.1109/ICIOT. 2018.00009, 2018 IEEE International Congress on Internet of Things, 2018, pp. 9-16, 8 pages total.

Ma Li et al., "Analysis of wave propagation on human body based on stratified media model", J. Cent. South Univ., 20, DOI: 10.1007/s11771-013-1880-5, 2013, pp. 3545-3551, 7 pages total.

Takanori Washiro, "Electric near field communication for identification and payment on wearable devices", 2016 IEEE International Symposium on Antennas and Propagation (APSURSI), DOI: 10.1109/APS.2016.7696443, 2016, 1 page total.

Yuichi Kado et al., "AC Electric Field Communication for Human-Area Networking", IEICE Trans. Electron., vol. E93-C, No. 3, Mar. 2010, pp. 234-243, 10 pages total.

Communication dated Apr. 1, 2021, issued by the European Patent Office in European Application No. 19846419.0.

Communication dated Nov. 21, 2019 issued by the International Searching Authority in counterpart Application No. PCT/KR2019/010095 (PCT/ISA/220, PCT/ISA/210, and PCT/ISA/237).

Communication dated Mar. 7, 2023, issued by European Patent Office in European Application No. 19846419.0.

* cited by examiner

HUMAN BODY COMMUNICATION APPARATUS FOR NEAR FIELD COMMUNICATION SIGNAL AND METHOD THEREOF

CROSS-REFERENCE TO RELATED APPLICATIONS

This application is a National Stage of International Application No. PCT/KR2019/010095 filed Aug. 9, 2019, claiming priority based on Russian Patent Application No. 2018129261, filed Aug. 10, 2018, the contents of all of which are incorporated herein by reference in their entirety.

TECHNICAL FIELD

The present disclosure relates to a human body communication (HBC) apparatus for a near field communication (NFC) signal and method thereof.

BACKGROUND ART

Recently, near field communication (NFC) technology is widely used in contactless payment, access control, and the like, and NFC functionality is often installed in mobile devices such as smart phones, smart watches, and the like. Because NFC usually operates within a distance of less than 10 cm, in most cases about 1 to 2 cm, a user has to bring his/her NFC device close to an NFC reader. On the other hand, such a short operating distance reinforces security because an NFC signal does not spread far in the air. Meanwhile, a human body communication (HBC) technology that is a communication technology using a body as a medium, has been recently developed.

DESCRIPTION OF EMBODIMENTS

Technical Problem

An embodiment of the disclosure maintains security of near field communication (NFC) while improving convenience of use.

Solution to Problem

According to an aspect of the present disclosure, a human body communication (HBC) apparatus for a near field communication (NFC) signal, the HBC apparatus includes: a first communicator configured to receive a first NFC signal from an NFC reader through a body in proximity to the body; and a second communicator configured to transmit a signal to a user device, wherein first data included in the first NFC signal received from the NFC reader through the body by the first communicator is transmitted to the user device by the second communicator.

The HBC apparatus may further include a reception amplifier configured to amplify the first NFC signal received from the NFC reader through the body by the first communicator.

The second communicator may receive, from the user device, second data that is a response to the first data, the HBC apparatus may further include a transmission amplifier configured to amplify a second NFC signal including the second data, and the second NFC signal may be transmitted to the NFC reader through the body by the first communicator after being amplified by the transmission amplifier.

According to another aspect of the present disclosure, a human body communication (HBC) apparatus for a near field communication (NFC) signal, the HBC apparatus includes: a first communicator configured to receive a first NFC signal from an NFC reader through a body in proximity to the body; and an NFC module configured to extract first data according to an NFC method, from the first NFC signal received from the NFC reader through the body by the first communicator.

The NFC module may further include a reception amplifier configured to amplify the first NFC signal received from the NFC reader through the body by the first communicator, and is configured to extract the first data according to the NFC method from the amplified first NFC signal.

The NFC module may be further configured to: generate a second NFC signal including second data that is a response to the first data according to the NFC method; and transmit the second NFC signal to the NFC reader through the body by the first communicator.

The NFC module may further include a transmission amplifier configured to amplify the generated second NFC signal, and is configured to transmit the amplified second NFC signal to the NFC reader through the body by the first communicator.

According to another aspect of the present disclosure, a near field communication (NFC) system includes: the HBC apparatus; and the NFC reader, wherein the NFC reader is configured to: generate the first NFC signal including the first data; and transmit the first NFC signal to the HBC apparatus through the body via parasitic capacitance of an NFC antenna coil in proximity to the body.

The HBC apparatus may be configured to transmit a second NFC signal including second data that is a response to the first data to the NFC reader through the body by the first communicator, and the NFC reader is configured to receive the second NFC signal from the HBC apparatus through the body via the parasitic capacitance of the NFC antenna coil in proximity to the body.

According to another aspect of the present disclosure, an operating method of a human body communication (HBC) apparatus for a near field communication (NFC) signal, the operating method includes: receiving a first NFC signal from an NFC reader through a body by a first communicator approaching the body; and transmitting first data included in the first NFC signal received from the NFC reader through the body by the first communicator to a user device by a second communicator.

According to another aspect of the present disclosure, an operating method of a human body communication (HBC) apparatus for a near field communication (NFC) signal, the operating method includes: receiving a first NFC signal from an NFC reader through a body by a first communicator approaching the body; and extracting first data according to an NFC method by an NFC module, from the first NFC signal received from the NFC reader through the body by the first communicator.

Advantageous Effects of Disclosure

An embodiment of the disclosure maintains security of near field communication (NFC) while improving convenience of use.

apparatus for a near field communication (NFC) signal communicating with a user device, according to an embodiment of the disclosure.

Figure 2:
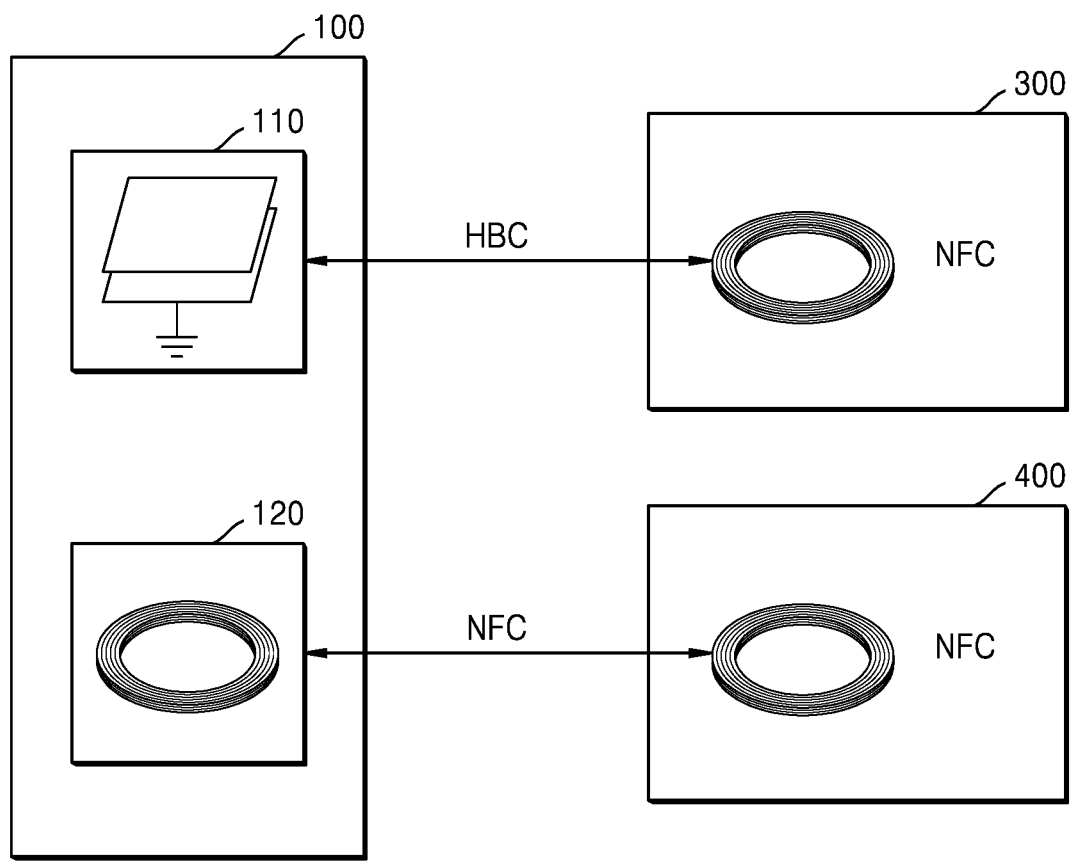

FIG. 2 is a schematic diagram of a configuration and an operating method of a HBC apparatus for an NFC signal communicating with a user device by using NFC, according to an embodiment of the disclosure.

Figure 3:
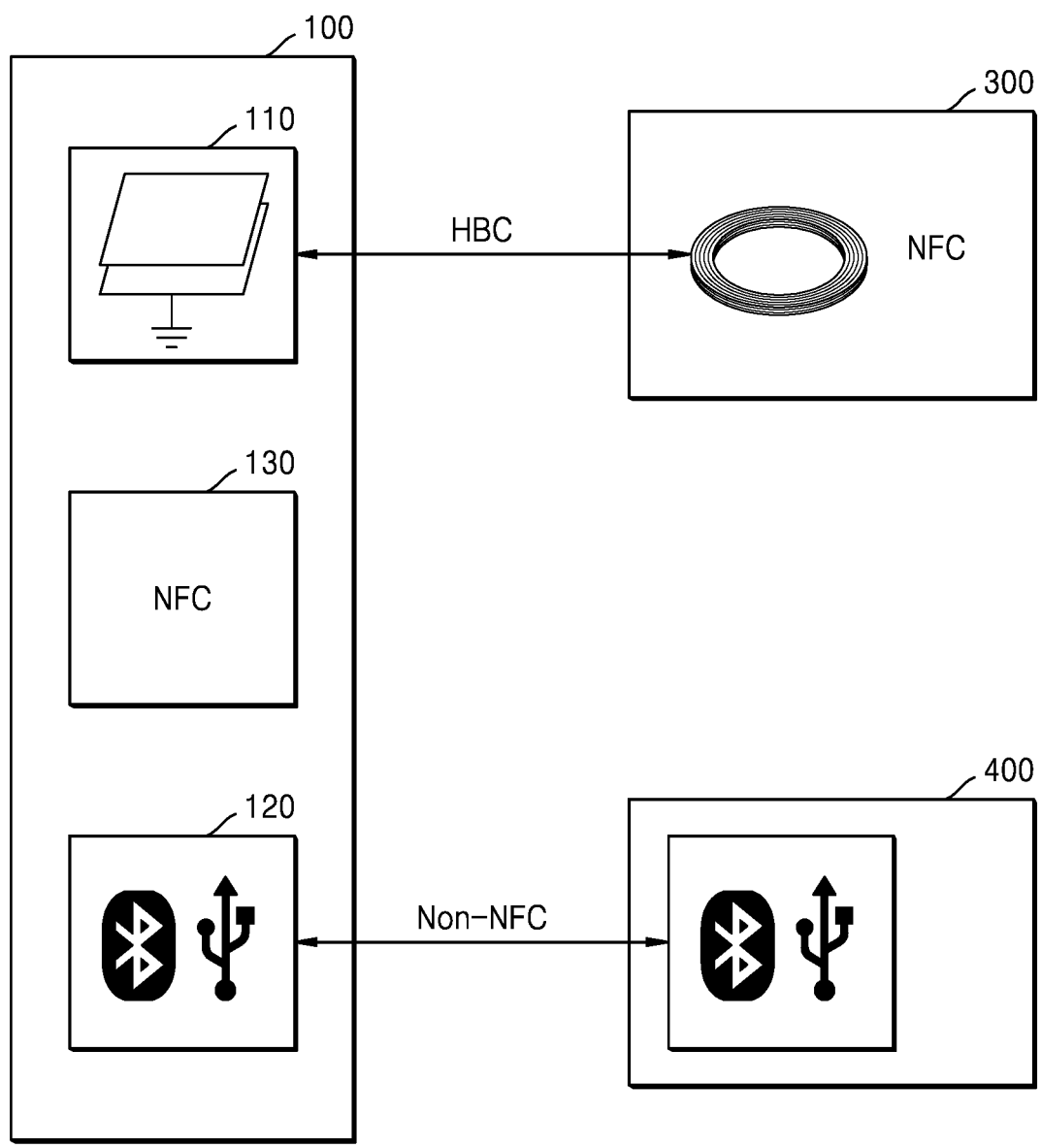

FIG. 3 is a schematic diagram of a configuration and an operating method of a HBC apparatus for an NFC signal communicating with a user device by using non-NFC, according to an embodiment of the disclosure.

Figure 4:
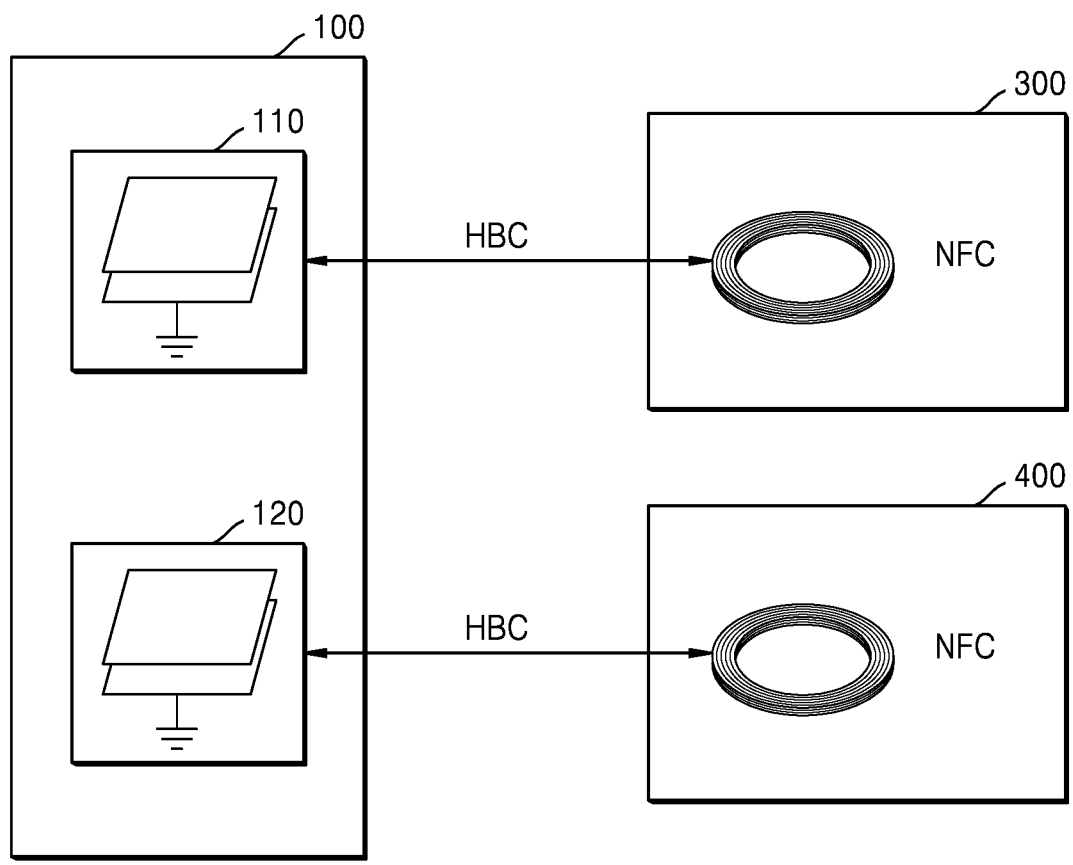

FIG. 4 is a schematic diagram of a configuration and an operating method of a HBC apparatus for an NFC signal communicating with a user device by using HBC, according to an embodiment of the disclosure.

Figure 5:
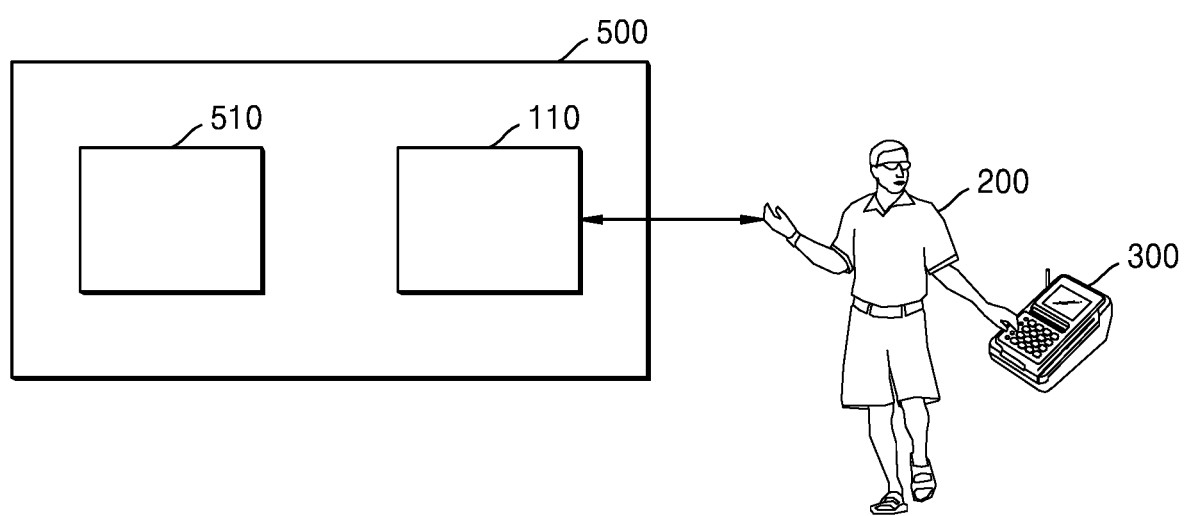

FIG. 5 is a schematic diagram of a configuration and an operating method of a HBC apparatus for an NFC signal, which includes an NFC function, according to an embodiment of the disclosure.

Figure 6:
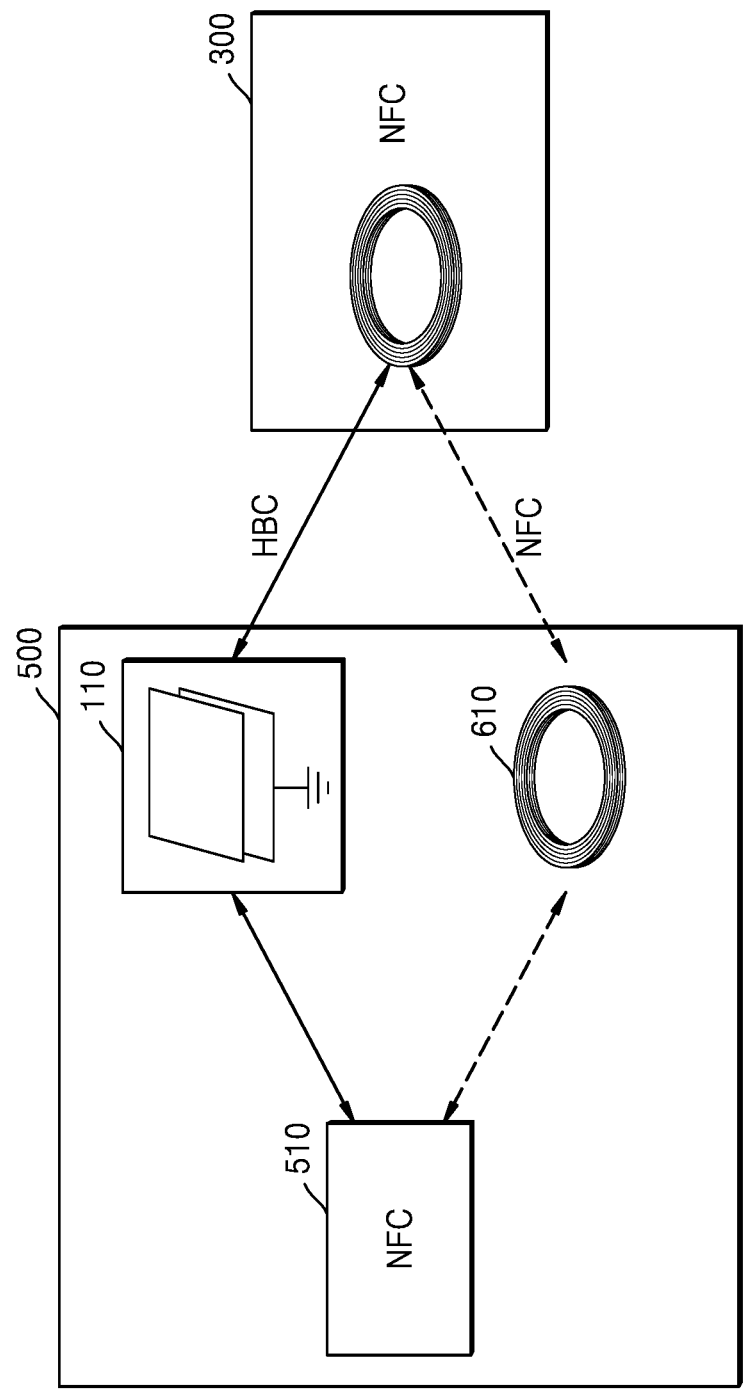

FIG. 6 is a schematic diagram of a configuration and an operating method of a HBC apparatus for an NFC signal, which includes an NFC function and communicates with an NFC reader by using an electrode, according to an embodiment of the disclosure.

Figure 7:
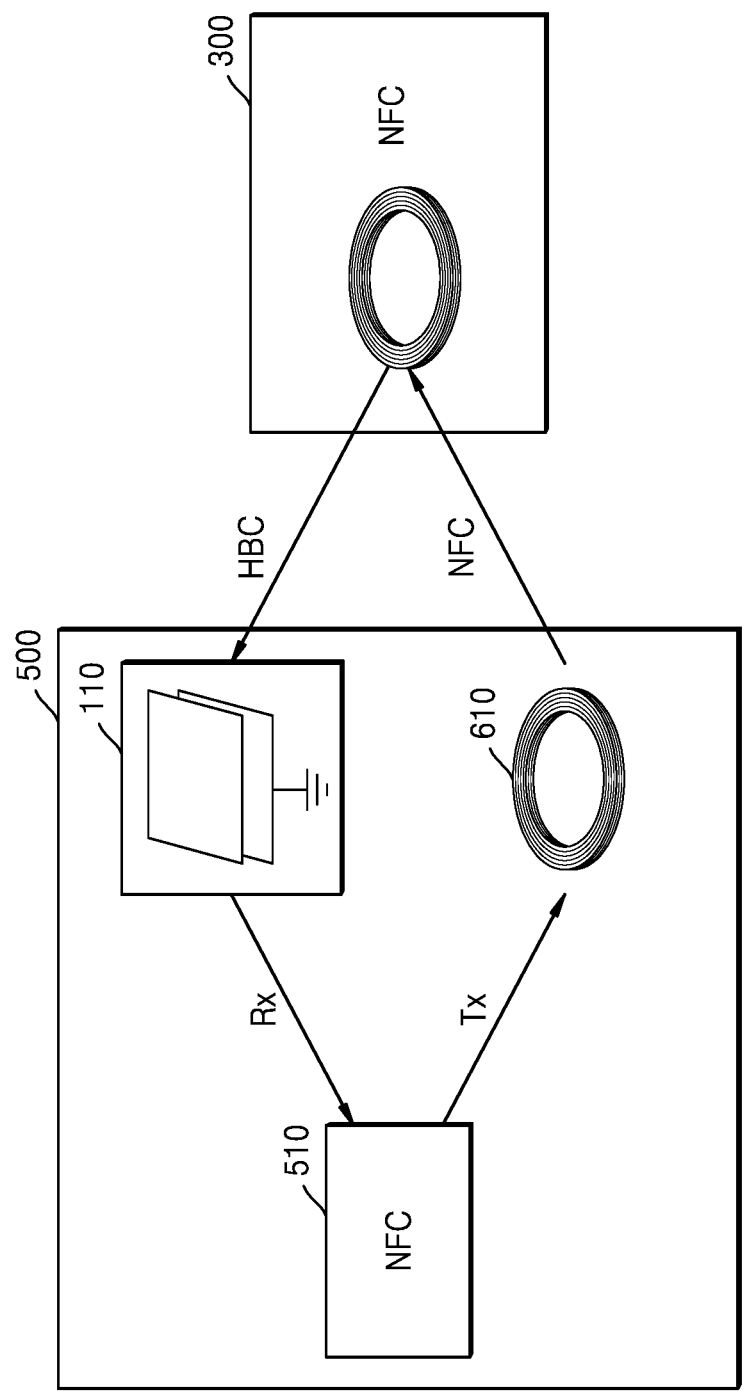

FIG. 7 is a schematic diagram of a configuration and an operating method of a HBC apparatus for an NFC signal, which includes an NFC function and communicates with an NFC reader by using an electrode and a coil, according to an embodiment of the disclosure.

Figure 8:

FIG. 8 is a diagram of a use case in which a user wearing a smart watch touches an NFC reader with a finger.

Figure 9:
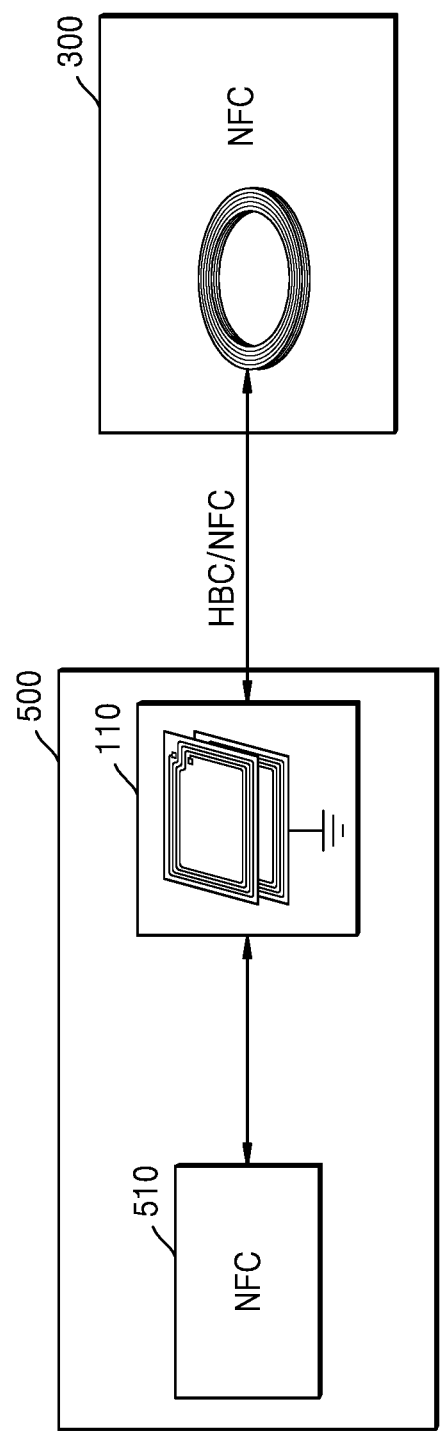

FIG. 9 is a schematic diagram of a configuration and an operating method of a HBC apparatus for an NFC signal, which includes an NFC function and communicates with an NFC reader by using an electro-magnetic combination device, according to an embodiment of the disclosure.

Figure 10:
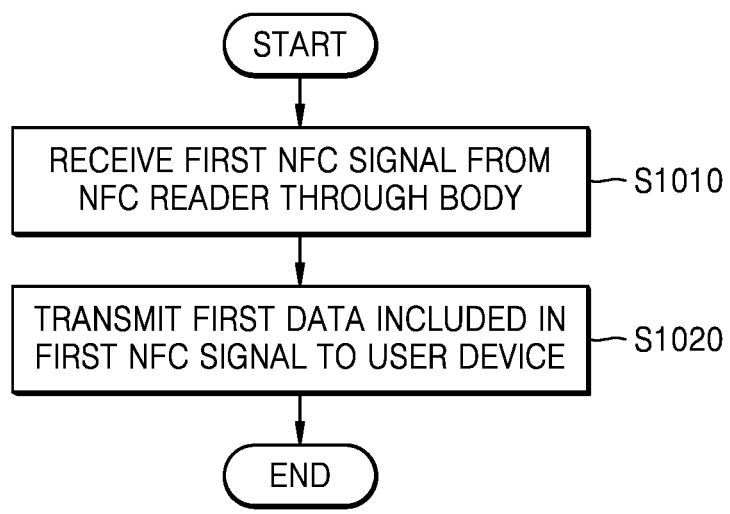

FIG. 10 is a flowchart of an operating method of a HBC apparatus for an NFC signal communicating with a user device, according to an embodiment of the disclosure.

Figure 11:
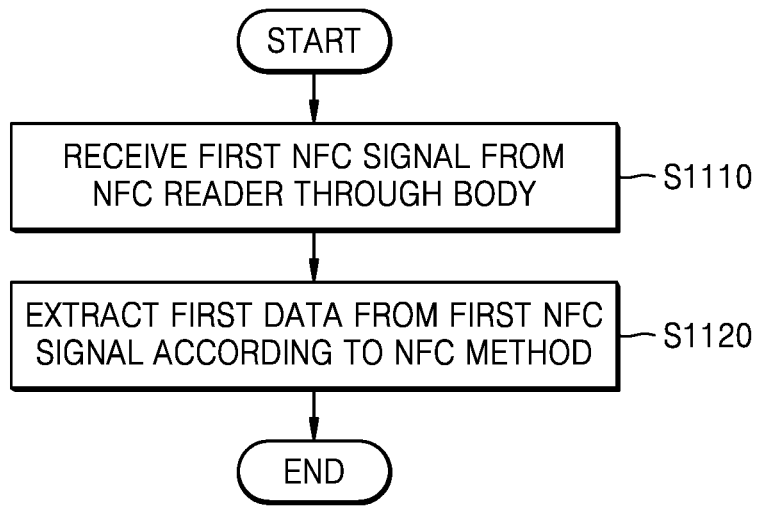

FIG. 11 is a flowchart of an operating method of a HBC apparatus for an NFC signal, which includes an NFC function, according to an embodiment of the disclosure.

Figure 12:
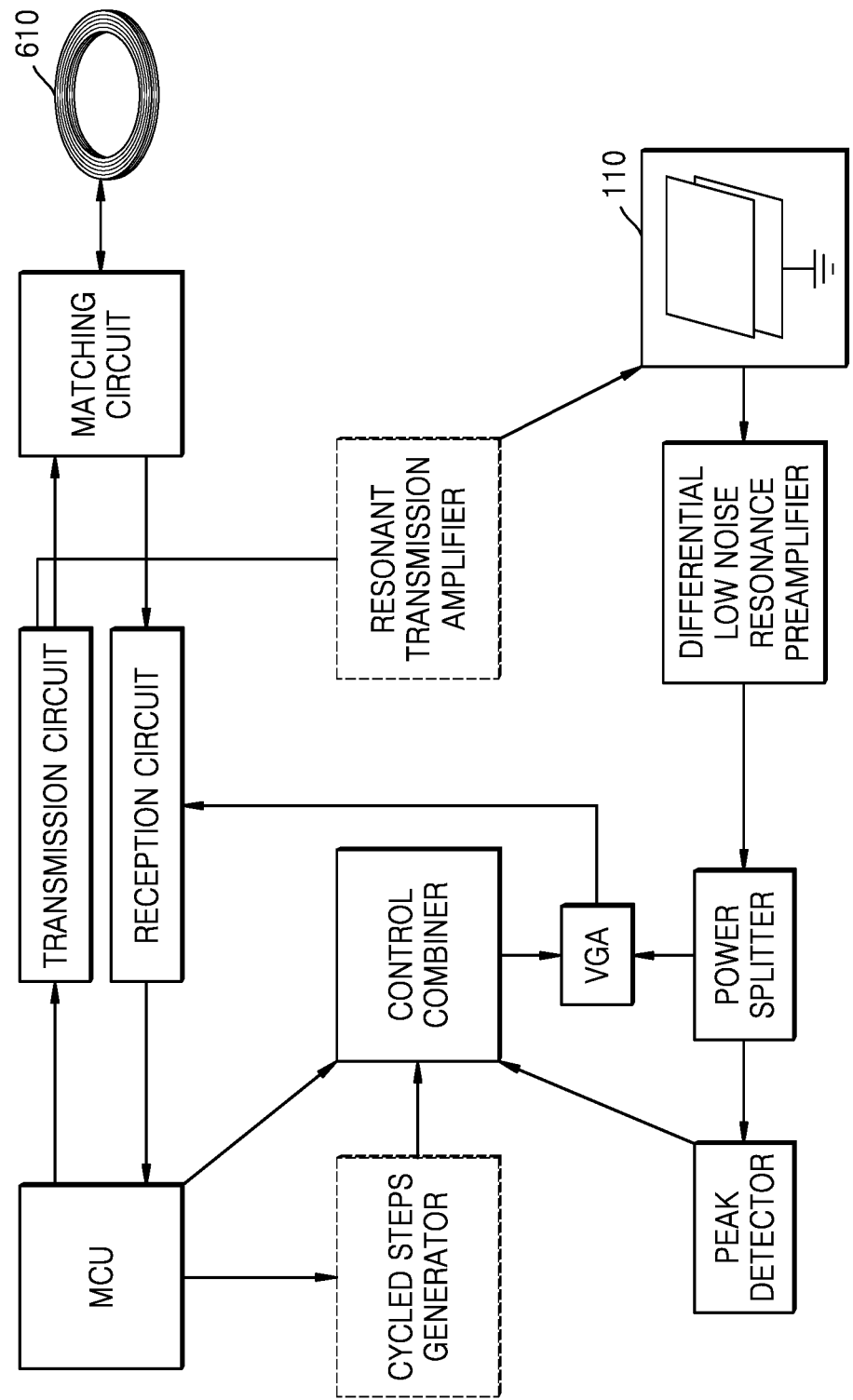

FIG. 12 is a block diagram of a HBC apparatus for an NFC signal, according to an embodiment of the disclosure.

Figure 13:
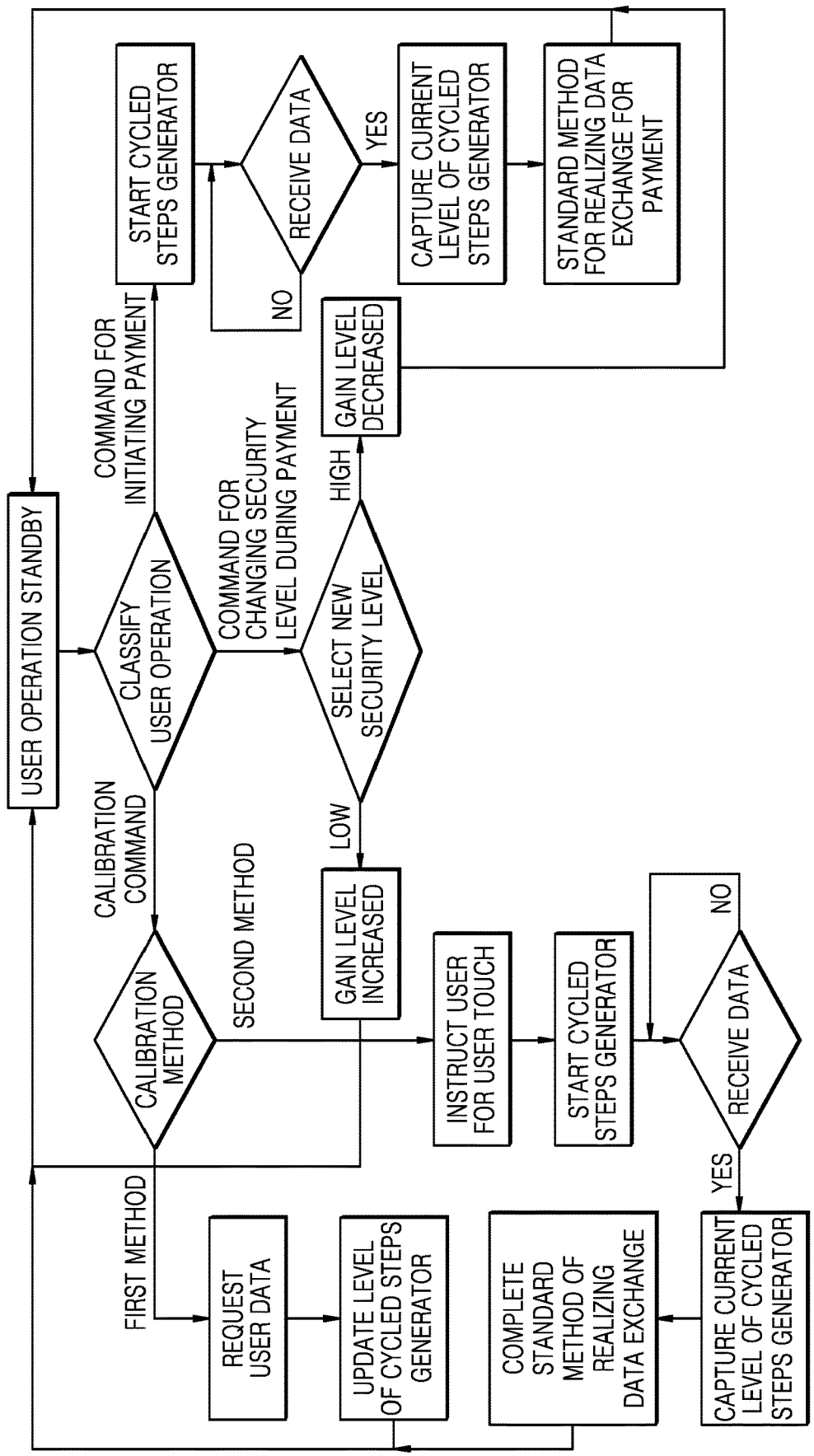

FIG. 13 is a block diagram of an operation algorithm of a microcontroller of a HBC apparatus when performing payment.

MODE OF DISCLOSURE

Hereinafter, embodiments of the disclosure will be described in detail with reference to the accompanying drawings such that one of ordinary skill in the art may easily implement the disclosure. However, the disclosure may be implemented in various different forms and is not limited to embodiments described herein. The particular implementations described in the disclosure are embodiments only and are not intended to limit the scope of the disclosure in any way. For the sake of brevity, descriptions of conventional electronics, control systems, software development, and other functional aspects of the systems may be omitted.

In the drawings, parts irrelevant to the description are omitted in order to clearly describe the disclosure, and like reference numerals designate like parts throughout the specification. Furthermore, the connecting lines or connecting members between components shown in the drawings are intended to represent exemplary functional relationships and/or physical or logical couplings. It should be noted that many alternative or additional functional relationships, physical connections or logical connections may be present in a practical device.

All terms used herein have general meanings widely used considering functions described in the disclosure, but the terms may have different meanings according to an intention of one of ordinary skill in the art, precedent cases, or the appearance of new technologies. Thus, the terms used herein have to be defined based on the meaning of the terms together with the description throughout the specification. While such terms as "first", "second", etc., may be used to describe various components, such components must not be limited to the above terms. The above terms are used only to distinguish one component from another. The phrases "according to an embodiment" and the like in the disclosure do not necessarily all refer to the same embodiment. Also, in the disclosure, the expression "at least one of a, b or c" indicates only a, only b, only c, both a and b, both a and c, both b and c, or all of a, b, and c.

An embodiment of the disclosure may be represented by functional block configurations and various processing steps. Such functional blocks may be realized by any number of hardware and/or software components configured to perform the specified functions. For example, the functional blocks of the disclosure may be implemented by one or more microprocessors or by circuit configurations for a certain function. In addition, for example, the functional blocks of the disclosure may be implemented in various programming or scripting languages. The functional blocks may be implemented in algorithms executed by one or more processors. In addition, the disclosure may employ the prior art for electronic configuration, signal processing, and/or data processing.

In describing the disclosure, when it is determined that a detailed description of related known functions or components may unnecessarily obscure the subject matter of the disclosure, the detailed description thereof will be omitted. For convenience of description, an apparatus and method may be described together when necessary.

Hereinafter, the disclosure will be described in detail with reference to the accompanying drawings.

Figure 1:
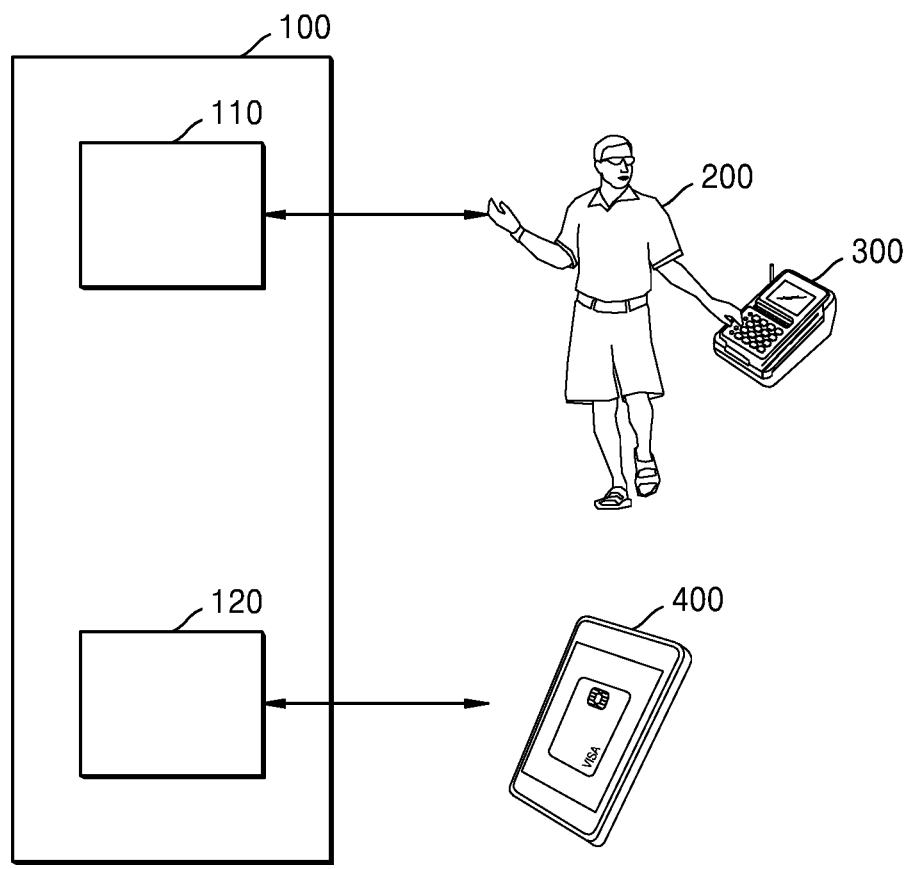
FIG. 1 is a schematic diagram of a configuration and an operating method of a human body communication (HBC)

FIG. 1 is a schematic diagram of a configuration and an operating method of a human body communication (HBC) apparatus for a near field communication (NFC) signal communicating with a user device, according to an embodiment of the disclosure. Referring to FIG. 1, a HBC apparatus 100 for an NFC signal, according to an embodiment of the disclosure, may include a first communicator 110 configured to receive an NFC signal from an NFC reader 300 through a body 200 in proximity to the body 200, and a second communicator 120 configured to transmit a signal to a user device 400. Here, the body 200 may generally denote a human body or may include a material of high permittivity similar to the human body, such as the body of an animal. The NFC reader 300 denotes a general NFC reader performing NFC according to the NFC standard. Examples of the NFC reader 300 may include a point-of-sale (POS) payment terminal, a public transportation fee payment terminal, an access control device, an information guide device, and the like. The NFC signal denotes a radio frequency (RF) signal according to the NFC standard, which is exchanged between NFC devices during NFC. The NFC standard may include ISO/IEC 14443, FeliCa, ISO/IEC 18092, or ECMA-340. Examples of the user device 400 may include a smart phone, a table computer, and a smart watch. The user device 400 may include an NFC function.

The NFC reader 300 is a general NFC device without a HBC function and includes an NFC antenna coil for NFC signal transmission, and when the body 200 approaches the NFC antenna coil, the NFC signal may be transmitted to the body 200 via parasitic capacitance. Here, the NFC reader 300 may or may not directly contact the body 200. For example, the NFC signal may be transmitted from the NFC reader 300 to the body 200 via capacitive coupling, even when a user touches the NFC reader 300 with a glove on. The NFC signal transmitted to the body 200 may reach the vicinity of the HBC apparatus 100 by propagating through the body 200 used as a medium. The NFC signal may propagate along a surface of the body 200 as creeping waves. In other words, the NFC reader 300 may generate the NFC signal and transmit the NFC signal to the HBC apparatus 100 through the body 200 via the parasitic capacitance of the NFC antenna coil in proximity to the body 200. The parasitic capacitance of the NFC antenna coil may be inter-wire intrinsic capacitance.

The first communicator 110 of the HBC apparatus 100 is a module for HBC and may receive the NFC signal transmitted through the body 200 from the NFC reader 300 in proximity to the body 200. The first communicator 110 may perform HBC generally via capacitive coupling using an electric field. According to an embodiment, the first communicator 110 may perform HBC via Galvanic coupling. A distance from the NFC reader 300 to the HBC apparatus 100, at which the NFC signal is transmitted via HBC, may be equal to or greater than 1 m.

Data included in the NFC signal received from the NFC reader 300 through the body 200 by the first communicator 110 may be transmitted to the user device 400 by the second communicator 120. Accordingly, the NFC reader 300 may transmit the data to the user device 400 through the body 200. Here, the data may be transmitted regardless of the NFC standard when transmitted to the user device 400 by the second communicator 120, may be transmitted according to a data format (for example, NFC data exchange format (NDEF) of the NFC standard, or may be transmitted according to an RF signal format of the NFC standard.

The HBC apparatus 100 may be implemented by being attached to the user device 400. For example, when the user device 400 is a smart phone, the HBC apparatus 100 may be a cover of the smart phone. The HBC apparatus 100 may be implemented as a wearable device. For example, the HBC apparatus 100 may be implemented as a smart watch or a smart textile device.

In general NFC, an NFC signal is transmitted through the air via electromagnetic induction between NFC antenna coils of nearby NFC devices, but in the disclosure, the NFC signal transmitted from the NFC reader 300 is transmitted to the first communicator 110 through the body 200. Accordingly, by using the HBC apparatus 100 for the NFC signal, the user may be able to perform NFC related to the user device 400 by placing a part of his/her body, for example, a hand, close to the NFC reader 300 without having to bring the user device 400 close to the NFC reader 300. For example, in the case of an NFC transportation card, the user may use public transportation by placing his/her hand close to an NFC transportation terminal without having to take out his/her smart phone having an NFC transportation card function from a pocket. The user may choose to perform general NFC by bringing his/her user device 400 having the NFC function close to the NFC reader 300.

When the user increases an operating distance of NFC of the user device 400 such that the user does not need to bring the user device 400 close to the NFC reader 300, the NFC signal propagates far into the air, thereby decreasing the security and there may be crosstalk when there are several NFC devices. However, according to the disclosure, because the NFC signal is transmitted using, as a medium, the body 200 positioned near the NFC reader 300 and the user device 400, the NFC signal does not propagate far into the air but localization of signals is achieved. Thus, according to the disclosure, convenience of use may be improved by increasing an operating distance of NFC while maintaining the security. Also, since the NFC reader 300 is a general NFC device, the HBC apparatus 100 for the NFC signal according to the disclosure does not require a change in an NFC reader for human body communication (HBC) with the NFC reader. In other words, the HBC apparatus 100 for the NFC signal according to the disclosure may perform HBC with NFC readers that are already installed and used.

The user device 400 may generate response data regarding the data received from the NFC reader 300 and transmit the response data to the HBC apparatus 100. Hereinafter, for convenience of description, the data transmitted from the NFC reader 300 to the user device 400 will be referred to as first data and the response data will be referred to as second data. The second data may be received by the second communicator 120. The NFC signal including the second data may be transmitted to the NFC reader 300 through the body 200 by the first communicator 110. Hereinafter, the NFC signal including the first data and transmitted from the NFC reader 300 to the first communicator 110 will be referred to as a first NFC signal and the NFC signal including the second data and transmitted from the first communicator 110 to the NFC reader 300 will be referred to as a second NFC signal. The second NFC signal may reach the NFC reader 300 by propagating through the body 200, and may be transmitted to the NFC reader 300 via parasitic capacitance of the NFC antenna coil of the NFC reader 300. In other words, the NFC reader 300 may receive the second NFC signal from the HBC apparatus 100 through the body 200 via the parasitic capacitance of the NFC antenna coil in proximity to the body 200. Accordingly, the NFC reader 300 and the user device 400 may perform bidirectional communication through the body 200 by the HBC apparatus 100 for the NFC signal.

Meanwhile, because the NFC reader 300 is a general NFC device without a HBC function and the first NFC signal is transmitted to the body 200 via the parasitic capacitance of the NFC antenna coil, the strength of the first NFC signal received by the HBC apparatus 100 is very weak. Accordingly, the HBC apparatus 100 may further include a reception amplifier for amplifying the first NFC signal received by the first communicator 110 to increase reception sensitivity. In other words, the HBC apparatus 100 may extract the first data from the first NFC signal amplified by the reception amplifier. In an actual situation, it is very difficult to receive an NFC signal transmitted through a body from a general NFC device without a HBC function, and thus HBC may be smoothly performed when the HBC apparatus 100 includes the reception amplifier.

Because the NFC reader 300 also receives the second NFC signal via the parasitic capacitance of the NFC antenna coil, the strength of the second NFC signal received by the NFC reader 300 may be weak. Accordingly, the HBC apparatus 100 may further include a transmission amplifier for amplifying the second NFC signal to increase transmission power. In other words, the HBC apparatus 100 may transmit the second NFC signal to the NFC reader 300 through the body 200 by the first communicator 110 after amplifying the second NFC signal by the transmission amplifier.

The reception amplifier and the transmission amplifier may have a controlled gain. A gain of an amplifier may be adjusted based on various conditions, such as a temperature, a skin condition, and whether a glove is worn. An example of a method of adjusting a gain of an amplifier will be described later. The HBC apparatus 100 may receive power for an amplifier or other devices from a battery or the user device 400. The HBC apparatus 100 may receive power from the user device 400 via wires or wirelessly.

FIG. 2 is a schematic diagram of a configuration and an operating method of a HBC apparatus for an NFC signal communicating with a user device by using NFC, according to an embodiment of the disclosure. Referring to FIG. 2, the first communicator 110 may include an electrode receiving the first NFC signal from the NFC reader 300 through the body 200 in proximity to the body 200. The second NFC signal may be transmitted to the NFC reader 300 by such an electrode. The electrode may have a plate shape to approach a surface of the body 200 in parallel. The area of the electrode may be about, for example, 1 $cm^2$. The electrode may be a capacitive emitting element. The electrode may include at least one of a flat capacitor (two electrodes), a dipole antenna, a monopole antenna, a planar inverted-F type antenna (PIFA), or a patch antenna.

The user device 400 may be a general NFC device performing NFC by the NFC antenna coil. The second communicator 120 may include an NFC antenna coil transmitting a signal to the user device 400. In other words, the first NFC signal received from the NFC reader 300 through the body 200 by the electrode may be transmitted to the user device 400 by the NFC antenna coil. Here, the first NFC signal may be transmitted to from the HBC apparatus 100 to the user device 400 via a general NFC method in which a signal is transmitted via electromagnetic induction between NFC antenna coils.

For example, the HBC apparatus 100 for transmitting an NFC signal includes the electrode receiving the first NFC signal from the NFC reader 300 through the body 200 in proximity to the body 200, and the NFC antenna coil transmitting the signal to the user device 400, wherein the first NFC signal received from the NFC reader 300 through the body 200 by the electrode may be transmitted to the user device 400 by the NFC antenna coil.

The HBC apparatus 100 may include a signal reception circuit connected to the electrode and a signal transmission circuit connected to the NFC antenna coil. The HBC apparatus 100 may include a matching circuit for impedance matching between the electrode and the NFC antenna coil.

The HBC apparatus 100 may further include the reception amplifier configured to amplify the first NFC signal received from the NFC reader 300 through the body 200 by the electrode, and the first NFC signal may be transmitted to the user device 400 by the NFC antenna coil after being amplified by the reception amplifier.

The reception amplifier configured to amplify the first NFC signal may be included in the user device 400. In other words, the user device 400 may include the reception amplifier configured to amplify the first NFC signal received from the NFC antenna coil.

The HBC apparatus 100 may receive the second NFC signal including the second data that is a response to the first data, from the user device 400 by the NFC antenna coil. Here, the second NFC signal may be transmitted to the HBC apparatus 100 from the user device 400 via a general NFC method in which a signal is transmitted via electromagnetic induction between NFC antenna coils.

The HBC apparatus 100 may include a signal reception circuit connected to the NFC antenna coil and a signal transmission circuit connected to the electrode.

The HBC apparatus 100 may further include the transmission amplifier configured to amplify the second NFC signal received from the user device 400 to be transmitted to the NFC reader 300, and the second NFC signal may be transmitted to the NFC reader 300 through the body 200 by the electrode after being amplified by the transmission amplifier. The transmission amplifier configured to amplify the second NFC signal may be included in the user device 400.

Hereinafter, while describing other embodiments, details overlapping the above description will be omitted if possible.

FIG. 3 is a schematic diagram of a configuration and an operating method of a HBC apparatus for an NFC signal communicating with a user device by using non-NFC, according to an embodiment of the disclosure. Referring to FIG. 3, the HBC apparatus 100 may further include an NFC processor 130 configured to extract the first data according to an NFC method, from the first NFC signal received from the NFC reader 300 through the body 200 by the electrode. The NFC processor 130 may include a commercial NFC integrated circuit (IC).

The second communicator 120 may communicate with the user device 400 by using a communication method other than NFC. Here, the communication method other than NFC may include a wireless communication method, such as Bluetooth, magnetic secure transmission (MST), and industrial scientific and medical (ISM), or a wired communication method, such as a universal serial bus (USB). Hereinafter, the communication method other than NFC will be referred to as a non-NFC communication method. A case in which the second communicator 120 communicates with the user device 400 by using an HBC method will be described later in a separate embodiment with reference to FIG. 4, and thus the non-NFC method does not include the HBC method here. The second communicator 120 may transmit the first data extracted by the NFC processor 130 to the user device 400 according to the non-NFC method. Here, the first data may be transmitted via a method irrelevant to the NFC standard or may be transmitted according to a data format (for example, an NFC data exchange format (NDEF)) of the NFC standard.

For example, the HBC apparatus 100 for transmitting an NFC signal may include the electrode receiving the first NFC signal from the NFC reader 300 through the body 200 in proximity to the body 200, the NFC processor 130 configured to extract the first data according to the NFC method from the first NFC signal received from the NFC reader 300 through the body 200 by the electrode, and the second communicator 120 configured to transmit the first data to the user device 400 according to the non-NFC method.

The second communicator 120 may receive the second data that is a response to the first data from the user device 400 according to the non-NFC method. Here, the second data may be received via a method irrelevant to the NFC standard or may be received according to a data format (for example, an NFC data exchange format (NDEF)) of the NFC standard. The NFC processor 130 may generate the second NFC signal including the second data according to the NFC method, and transmit the second NFC signal to the NFC reader 300 through the body 200 by the electrode.

Here, the user device 400 may not include an NFC function. In other words, even when the user device 400 does not include the NFC function, the user may enable NFC between the user device 400 and the NFC reader 300 by using the HBC apparatus 100 for transmitting an NFC signal, according to the current embodiment. Obviously, even when the user device 400 includes the NFC function, the HBC apparatus 100 for transmitting an NFC signal, according to the current embodiment, may be used.

The HBC apparatus 100 may include the signal reception circuit and the signal transmission circuit connected to the electrode. The HBC apparatus 100 may include the matching circuit connected to the electrode.

The NFC processor 130 may further include the reception amplifier configured to amplify the first NFC signal received from the NFC reader 300 through the body 200 by the electrode, and extract the first data from the amplified first NFC signal according to the NFC method.

The NFC processor 130 may further include the transmission amplifier configured to amplify the generated second NFC signal to be transmitted to the NFC reader 300, and transmit the amplified second NFC signal to the NFC reader 300 through the body 200 by the electrode.

FIG. 4 is a schematic diagram of a configuration and an operating method of a HBC apparatus for an NFC signal communicating with a user device by using HBC, according to an embodiment of the disclosure. Referring to FIG. 4, the first communicator 110 may include a first electrode receiving the first NFC signal from the NFC reader 300 through the body 200 in proximity to a first location of the body 200, and the second communicator 120 may include a second electrode transmitting a signal to the user device 400 through the body 200 in proximity to a second location of the body 200.

In other words, the HBC apparatus 100 for transmitting an NFC signal may include the first electrode receiving the first NFC signal from the NFC reader 300 through the body 200 in proximity to the first location of the body 200, and the second electrode transmitting the signal to the user device 400 through the body 200 in proximity to the second location of the body 200.

The first NFC signal received from the NFC reader 300 through the body 200 by the first electrode may be transmitted to the user device 400 through the body 200 by the second electrode. Here, the user device 400 may be a general NFC device without a HBC function. The user device 400 may include the NFC antenna coil and receive the first NFC signal from the HBC apparatus 100 through the body 200 via parasitic capacitance of the NFC antenna coil.

The HBC apparatus 100 may include the signal reception circuit connected to the first electrode. The HBC apparatus 100 may include the signal transmission circuit connected to the second electrode.

The HBC apparatus 100 may further include the reception amplifier configured to amplify the first NFC signal received from the NFC reader 300 through the body 200 by the first electrode, and the first NFC signal may be transmitted to the user device 400 through the body 200 by the second electrode after being amplified by the reception amplifier.

The reception amplifier configured to amplify the first NFC signal may be included in the user device 400. In other words, the user device 400 may include the reception amplifier configured to amplify the first NFC signal received from the second electrode through the body 200.

The HBC apparatus 100 may receive the second NFC signal including the second data that is a response to the first data, from the user device 400 through the body 200 by the second electrode. Here, the second NFC signal may be transmitted to the HBC apparatus 100 through the body 200 via the parasitic capacitance of the NFC antenna coil of the user device 400. The received second NFC signal may be transmitted to the NFC reader 300 through the body 200 by the first electrode.

The HBC apparatus 100 may include the signal reception circuit connected to the second electrode. The HBC apparatus 100 may include the signal transmission circuit connected to the first electrode.

The HBC apparatus 100 may further include the transmission amplifier configured to amplify the second NFC signal received from the user device 400 to be transmitted to the NFC reader 300, and the second NFC signal may be transmitted to the NFC reader 300 through the body 200 by the first electrode after being amplified by the transmission amplifier. The transmission amplifier configured to amplify the second NFC signal may be included in the user device 400.

The matching circuit may be provided between an electrode and an amplifier.

According to the current embodiment, the user device 400 may communicate with the NFC reader 300 near the body of the user wherever the user device 400 is located in the body of the user. The HBC apparatus 100 may be implemented as a smart textile device.

FIG. 5 is a schematic diagram of a configuration and an operating method of a HBC apparatus for an NFC signal, which includes an NFC function, according to an embodiment of the disclosure. Referring to FIG. 5, a HBC apparatus 500 for an NFC signal including an NFC function, according to an embodiment of the disclosure, may include the first communicator 110 configured to receive a first NFC signal from the NFC reader 300 through the body 200, and an NFC module 510 configured to extract the first data from the first NFC signal received from the NFC reader 300 through the body 200 by the first communicator 110 according to the NFC method. The NFC module 510 may include a commercial NFC IC. In the embodiments described with reference to FIGS. 1 through 4, the HBC apparatus 100 for an NFC signal is implemented as a stand-alone type separately from the user device 400, but in the current embodiment, the first communicator 110 for HBC is embedded in a user device 500 including an NFC function and thus the user device itself becomes an HBC apparatus for an NFC signal. Accordingly, the NFC reader 300 may generate the first NFC signal and transmit the first NFC signal to the HBC apparatus 500 through the body 200 via the parasitic capacitance of the NFC antenna coil in proximity to the body 200, and the HBC apparatus 500 may receive the first NFC signal.

The NFC module 510 may generate the second NFC signal including the second data that is a response to the first data according to the NFC method, and transmit the second NFC signal to the NFC reader 300 through the body 200 by the first communicator 110. The NFC reader 300 may receive the second NFC signal from the HBC apparatus 500 through the body 200 via the parasitic capacitance of the NFC antenna coil in proximity to the body 200.

As such, because the HBC apparatus 500 for an NFC signal may communicate with a general NFC reader without a HBC function through the body 200, the user may perform NFC by bringing a part of his/her body close to the NFC reader 300 while holding the HBC apparatus 500 for an NFC signal.

Meanwhile, the NFC module 510 may further include the reception amplifier configured to amplify the first NFC signal received from the NFC reader 300 through the body 200 by the first communicator 110, and extract the first data from the amplified first NFC signal according to the NFC method. Also, the NFC module 510 may further include the transmission amplifier configured to amplify the generated second NFC signal and transmit the amplified second NFC signal to the NFC reader 300 through the body 200 by the first communicator 110.

FIG. 6 is a schematic diagram of a configuration and an operating method of a HBC apparatus for an NFC signal, which includes an NFC function and communicates with an NFC reader by using an electrode, according to an embodiment of the disclosure. Referring to FIG. 6, the first communicator 110 may include the electrode receiving the first NFC signal from the NFC reader 300 through the body 200 in proximity to the body 200.

The NFC module 510 may extract the first data, according to the NFC method, from the first NFC signal received from the NFC module 510 through the body 200 by the electrode. The NFC module 510 may generate the second NFC signal including the second data that is a response to the first data according to the NFC method, and transmit the second NFC signal to the NFC reader 300 through the body 200 by the electrode.

The electrode may be connected to a reception circuit of the NFC module 510. The electrode may be connected to a transmission circuit of the NFC module 510. A matching circuit may be provided between the electrode and the NFC module 510.

The NFC module 510 may further include the reception amplifier configured to amplify the first NFC signal received from the NFC reader 300 through the body 200 by the electrode, and extract the first data from the amplified first NFC signal according to the NFC method. The NFC module 510 may include the transmission amplifier configured to amplify the generated second NFC signal and transmit the amplified second NFC signal to the NFC reader 300 through the body 200 by the electrode.

Also, the HBC apparatus 500 may further include an NFC antenna coil 610. Accordingly, the NFC module 510 may perform general NFC by the NFC antenna coil 610 in addition to the HBC described above. In other words, the NFC module 510 may extract third data, according to the NFC method, from a third NFC signal received from the NFC reader 300 by the NFC antenna coil 610, generate a fourth NFC signal including fourth data that is a response to the third data according to the NFC method, and transmit the fourth NFC signal to the NFC reader 300 by the NFC antenna coil 610. Here, the third NFC signal and the fourth NFC signal are transmitted via a general NFC method according to electromagnetic induction between the NFC antenna coil 610 of the HBC apparatus 500 and the NFC antenna coil of the NFC reader 300, which are close to each other. The NFC antenna coil 610 may be connected to the signal reception circuit of the NFC module 510. The NFC antenna coil 610 may be connected to the signal transmission circuit of the NFC module 510. A matching circuit may be provided between the NFC antenna coil 610 and the NFC module 510.

FIG. 7 is a schematic diagram of a configuration and an operating method of a HBC apparatus for an NFC signal, which includes an NFC function and communicates with an NFC reader by using an electrode and a coil, according to an embodiment of the disclosure. Referring to FIG. 7, the HBC apparatus 500 includes the NFC antenna coil 610, wherein reception of an NFC signal may be performed by the electrode and transmission of an NFC signal may be performed by the NFC antenna coil 610. Here, the electrode may be connected to the reception circuit of the NFC module 510 and the NFC antenna coil 610 may be connected to the transmission circuit of the NFC module 510. The electrode may be connected to both the reception circuit and the transmission circuit of the NFC module 510 and may be used only for reception when required. The NFC antenna coil 610 may be connected to both the reception circuit and the transmission circuit of the NFC module 510 and may be used only for transmission when required. A matching circuit may be provided between the electrode and the NFC module 510. A matching circuit may be provided between the NFC antenna coil 610 and the NFC module 510.

The NFC module 510 may extract the first data, according to the NFC method, from the first NFC signal received from the NFC module 510 through the body 200 by the electrode. The NFC module 510 may generate the second NFC signal including the second data that is a response to the first data according to the NFC method, and transmit the second NFC signal to the NFC reader 300 through the body 200 by the NFC antenna coil 610.

The NFC module 510 may further include the reception amplifier configured to amplify the first NFC signal received from the NFC reader 300 through the body 200 by the electrode, and extract the first data from the amplified first NFC signal according to the NFC method. The NFC module 510 may include the transmission amplifier configured to amplify the generated second NFC signal and transmit the amplified second NFC signal to the NFC reader 300 through the body 200 by the NFC antenna coil 610.

The current embodiment is useful when an NFC signal is transmittable to an NFC reader through an NFC antenna coil but is not receivable from the NFC reader. For example, when the HBC apparatus 500 is a smart watch and a distance from the smart watch worn on a wrist of the user to an NFC payment device is sufficient to transmit an NFC signal via a general NFC method but attenuation is too large to receive the NFC signal via the general NFC method, the user may place a finger close to the NFC payment device to receive the NFC signal via HBC. FIG. 8 is a diagram of a use case in which a user wearing a smart watch touches an NFC reader with a finger.

According to an embodiment, alternatively, the reception of the NFC signal may be performed by the NFC antenna coil 610 and the transmission of the NFC signal may be performed by the electrode. Here, the electrode may be connected to the transmission circuit of the NFC module 510 and the NFC antenna coil 610 may be connected to the reception circuit of the NFC module 510. The electrode may be connected to both the reception circuit and the transmission circuit of the NFC module 510 and may be used only for transmission when required. The NFC antenna coil 610 may be connected to both the reception circuit and the transmission circuit of the NFC module 510 and may be used only for reception when required.

FIG. 9 is a schematic diagram of a configuration and an operating method of a HBC apparatus for an NFC signal, which includes an NFC function and communicates with an NFC reader by using an electro-magnetic combination device, according to an embodiment of the disclosure. Referring to FIG. 9, the first communicator 110 may include a combined electro-magnetic element receiving the first NFC signal from the NFC reader 300 through the body 200 in proximity to the body 200. The combined electro-magnetic element is an element capable of performing both NFC and HBC by including sufficient inductance and capacitance. For example, the combined electro-magnetic element may perform HBC via capacitive coupling and perform NFC via electromagnetic induction. The combined electro-magnetic element may include a coil mixed with dipole or a coil with specially increased intrinsic capacitance.

A resonant frequency of the combined electro-magnetic element may be set equal to or close to an RF frequency (for example, 13.56 MHz) of the NFC standard. Here, since it is impossible for two frequencies to be completely the same physically, the same may include substantially the same. When the resonant frequency of the combined electro-magnetic element is set equal to or close to the RF frequency of the NFC standard, HBC may be possible even when a distance between the combined electro-magnetic element and the body 200 is somewhat large. An NFC signal may be transmitted via capacitance between the combined electro-magnetic element and the body 200 when the combined electro-magnetic element and the body 200 are separated from each other.

The NFC module 510 may extract the first data, according to the NFC method, from the first NFC signal received from the NFC module 510 through the body 200 by the combined electro-magnetic element. The NFC module 510 may generate the second NFC signal including the second data that is a response to the first data according to the NFC method, and transmit the second NFC signal to the NFC reader 300 through the body 200 by the combined electro-magnetic element.

The combined electro-magnetic element may be connected to the reception circuit of the NFC module 510. The combined electro-magnetic element may be connected to the transmission circuit of the NFC module 510. A matching circuit may be provided between the combined electro-magnetic element and the NFC module 510.

The NFC module 510 may further include the reception amplifier configured to amplify the first NFC signal received from the NFC reader 300 through the body 200 by the combined electro-magnetic element, and extract the first data from the amplified first NFC signal according to the NFC method. The NFC module 510 may include the transmission amplifier configured to amplify the generated second NFC signal and transmit the amplified second NFC signal to the NFC reader 300 through the body 200 by the combined electro-magnetic element.

The HBC apparatus 100 or 500 for an NFC signal according to the disclosure described above with reference to FIGS. 1 through 9 is able to exchange an NFC signal with a general NFC reader 300 without a HBC function via HBC and may operate as an active mode NFC with respect to the NFC reader 300. The HBC apparatus 100 or 500 for an NFC signal according to the disclosure may be used for POS payment, public transportation fee payment, road toll payment, user identification, pairing or data transmission between IoT devices, entrance control, information guide system, robot control, and pet identification. For example, various applications are possible, such as, when the user manipulates a terminal by hand, the user may be recognized, according to a smart watch worn on the wrist of the user, so as to be able to receive different access levels or authorities based on the user or receive a service customized for the user, when the user wears a headphone on the head, the headphone may be Bluetooth-paired with a smart phone held by the user via NFC, or a door for an animal may be opened when an animal wearing a particular NFC necklace steps on a doormat in front of a door.

FIG. 10 is a flowchart of an operating method of a HBC apparatus for an NFC signal communicating with a user device, according to an embodiment of the disclosure. Referring to FIG. 10, an operating method of the HBC apparatus 100 for an NFC signal, according to an embodiment of the disclosure, may include receiving the first NFC signal from the NFC reader 300 through the body 200 by the first communicator 110 approaching the body 200 (operation S1010), and transmitting the first data included in the first NFC signal received from the NFC reader 300 through the body 200 by the first communicator 110 to the user device 400 by the second communicator 120 (operation S1020).

FIG. 11 is a flowchart of an operating method of a HBC apparatus for an NFC signal, which includes an NFC function, according to an embodiment of the disclosure. Referring to FIG. 11, an operating method of the HBC apparatus 500 for an NFC signal, according to an embodiment of the disclosure, may include receiving the first NFC signal from the NFC reader 300 through the body 200 by the first communicator 110 approaching the body 200 (operation S1110), and extracting the first data according to the NFC method by the NFC module 510, from the first NFC signal received from the NFC reader 300 through the body 200 by the first communicator 110 (operation S1110).

The transmission or reception amplifier described above may be implemented as a variable gain amplifier by using a standard automatic gain control (AGC). By adjusting a gain level, a security level may be automatically changed according to signal strength of the NFC reader 300. For example, when a security level is high, a user has to directly contact their body to an NFC reader, and when the security level is low, the user may take their body close to the NFC reader or contact the NFC reader through clothes, for example, with a hand wearing a glove.

As well known, power is reduced when an electromagnetic signal is transmitted. In other words, a transmitted signal is weakened. The weakening of the transmitted signal depends on many factors, such as a characteristic of the body and a distance at which the signal is transmitted. The characteristic of the body may be a humidity level, a skin age, permittivity, a hydration level, or a temperature. FIG. 12 is a block diagram of a HBO apparatus for an NFC signal, according to an embodiment of the disclosure. Referring to FIG. 12, the first signal received from the NFC reader 300 through the body 200 by the electrode is input to a differential low noise resonance preamplifier that reduced an in-phase noise component. After the reduction is performed, the signal is split into two output signals based on a power ratio given by a power splitter. One of the output signals is amplified by a variable gain amplifier to an optimum gain level to equalize amplitude of a signal to meet a limit of a dynamic range of the reception circuit. The other output signal is input to a peak detector that determines current signal power for calibration of the variable gain amplifier for setting the optimum gain level. An output signal of the peak detector, which includes information about the power level of the signal detected by the electrode, is input to a control combiner. The control combiner adjusts a gain value of the variable gain amplifier, based on data received from the peak detector.

Also, the HBO apparatus 100 may selectively include a cycled steps generator. In this case, the control combiner has two inputs, i.e., an input from the peak detector described above, and an input from the cycled steps generator for sequentially repeating possible gain values of the variable gain amplifier. Starting, stopping, and a start level (an initial gain value is set to 0) of the cycled steps generator may be set by using a micro-control unit (MCU). A memory of the MCU may store a fixed value of a level of the cycled steps generator, at which an NFC signal was successfully exchanged previously. The stored fixed value may be set as the start level of the cycled steps generator by the MCU. Accordingly, the control combiner processes data received from the peak detector and the cycled steps generator, and then transmits a generator level to the variable gain amplifier to set the optimum gain level required for a signal of the current moment. Also, the MCU may transmit a settable security level to the control combiner according to power of the signal transmitted from the NFC reader 300 or according to a condition set by the user. Security level setting may also be considered when setting the gain level described above. When a condition of a communication channel deteriorates (for example, when packet exchange according to the standard NFC technology is interrupted), the MCU may transmit a command to restart the cycled steps generator for a new step of calibrating the optimum gain level.

The signal amplified from the variable gain amplifier is transmitted to the reception circuit, and here, the signal is demodulated to be converted to a digital data packet and then transmitted to the MCU. The MCU transmits a response digital data packet to the transmission circuit. The transmission circuit converts the response digital data packet received from the MCU into an electromagnetic signal (for example, the transmission circuit may modulate a 13.56 MHz carrier frequency). The electromagnetic signal from the transmission circuit is transmitted to a resonant transmission amplifier having a certain gain coefficient in a narrow frequency band near the carrier frequency. There may be no resonant transmission amplifier. When there is no resonant transmission amplifier, the signal from the transmission circuit is directly transmitted to the electrode for transmission via surface waves.

When communication according to the standard NFC technology, i.e., according to electromagnetic induction using the NFC antenna coil 610, is realized by using the HBC apparatus 100, the signal from the transmission circuit may be transmitted to the matching circuit performing impedance matching and signal filtering. A matched signal is transmitted to the NFC antenna coil 610 to be transmitted to the NFC reader 300 (in particular, an antenna coil of the NFC reader 300), via the electromagnetic induction.

Also, the HBC apparatus 100 may be calibrated based on the characteristics of the body described above. In other words, the user may select one of two methods to calibrate a HBC apparatus. A first calibration method is calibration based on set data (user data). According to such a method, the user inputs user data, such as the weight, the age, the gender, or the like, to the HBC apparatus. The HBC apparatus refers to a lookup table pre-stored in the HBC apparatus to determine a corresponding relationship between input data and an average required gain of the input data. Also, the HBC apparatus may set a gain level to reduce an amplifier calibration time during a later operation. According to a second calibration method, calibration is performed by using an HBC apparatus itself. In particular, when the second calibration method is selected, a guide for the user to touch the HBC apparatus is displayed on a screen of the HBC apparatus. Then, the user touches the HBC apparatus when an NFC antenna coil is in an active mode, and the HBC apparatus starts to receive data through the NFC antenna coil and adjusts a gain parameter of an amplifier. When the calibration is completed, the HBC apparatus notifies the user of the completion, stores a new gain parameter for the user, and sets the gain level of the HBC apparatus.

FIG. 13 is a block diagram of an operation algorithm of a microcontroller of a HBC apparatus when performing payment. Referring to FIG. 13, the HBC apparatus 100 is in a standby mode for a user operation. When the user performs an operation, in particular, touches a screen, the MCU classifies the operation. When the operation is classified as a calibration command, a calibration method is additionally determined. When the first calibration method is selected, the MCU of the HBC apparatus 100 requests the user data and updates a level of the cycled steps generator, based on the user data and the pre-stored lookup table. When there is no cycled steps generator, the calibration is performed only by the peak detector according to the method described above with reference to FIG. 5. The HBC apparatus 100 (in particular, the MCU) returns to the standby mode for the user operation.

When the second calibration method is selected, the HBC apparatus 100 requests the user to touch the HBC apparatus 100. The cycled steps generator is started and a generator start level is set by the MCU of the HBC apparatus 100. In particular, the start level of the generator when used first is set to a gain value 0. Then, when the calibration is completed, a current level of the generator is stored in the memory of the HBC apparatus 100, and the start of the generator when the generator is used next is set as a last value of the generator level stored in the memory.

Unless the MCU captures data reception by the reception circuit of the HBC apparatus 100, the cycled steps generator repeats the data reception until data is received or until the user stops the operation. Upon receiving the data, the cycled steps generator captures the current level of the cycled steps generator. In other words, the cycled steps generator stops at a current control voltage level. Also, a standard method of realizing data exchange with the NFC reader 300 is completed, and then the HBC apparatus 100 returns to the standby mode for the user operation.

When the user operation is classified as a command for changing a security level during payment, a prompt for selecting a new security level (low or high) is displayed to the user. When a low security level is selected, a gain level is increased. In other words, the user may make payment by directly or not directly (for example, through a glove) contacting the NFC reader. When a high security level is selected, the gain level is decreased. In other words, the payment is possible only via physical contact (for example, direct touch) between the NFC reader and the user. After the gain level is increased or decreased by the MCU, the HBC apparatus 100 returns back to the standby mode for the user operation.

When the user operation is classified as a command for initiating payment, the cycled steps generator starts to receive data and the start level of the generator is set as described above. Unless the MCU captures data reception by the reception circuit of the HBC apparatus 100, the cycled steps generator repeats the data reception until data is received or until the user stops the operation. Upon receiving the data, the cycled steps generator captures the current level of the generator. For the payment, a standard method for realizing data exchange with the NFC reader is additionally performed. Then, the HBC apparatus 100 returns to the standby mode for the user operation, and for example, is ready to initiate next payment.

An embodiment of the disclosure may also be realized in a form of a recording medium including instructions executable by a computer, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable instruction, a data structure, or other data of a modulated data signal, such as a program module. Also, it is possible to record a database used in the disclosure on a recording medium.

Hereinabove, the disclosure has been described in detail with reference to embodiments shown in the drawings. The embodiments are not intended to limit the disclosure, but only examples and should be considered in a descriptive sense only and not for purposes of limitation. One of ordinary skill in the art will understand that these embodiments may be easily modified in other specific forms without changing the technical ideas or essential features of the disclosure. For example, each component described as a single type may be implemented in a distributed manner, and similarly, components described as distributed may be implemented in a combined form.

Although specific terms have been used herein, they are used only for the purpose of illustrating the concepts of the disclosure and are not intended to limit the meaning or the scope of the disclosure as defined in the claims. Operation of the disclosure need not necessarily be performed in the order described, and may be performed in parallel, selectively, or individually.

The true technical protection scope of the disclosure should be defined by the technical ideas of the appended claims rather than the foregoing description, and all changes or modifications derived from the meaning and scope of the claims and their equivalents should be interpreted as being included in the scope of the disclosure. The equivalents are to be understood to include not only equivalents now known but also equivalents to be developed in the future, i.e., all components disclosed to perform the same function regardless of structure.

The invention claimed is:

1. A human body communication (HBC) apparatus for a near field communication (NFC) signal, the HBC apparatus comprising:
   a first communicator configured to receive a first NFC signal from an NFC reader according to an NFC standard through a body in proximity to the body, wherein the first NFC signal is a signal according to the NFC standard, the first NFC signal propagates along a surface of the body, the first communicator comprises an electrode configured to receive the first NFC signal, and the electrode is a plate-shaped electrode that is parallel to the surface of the body;
   an NFC processor configured to extract first data according to an NFC method from the first NFC signal received from the NFC reader through the body;
   a second communicator configured to transmit a signal to a user device, wherein the second communicator comprises an NFC antenna coil configured to transmit the signal to the user device; and
   a matching circuit configured to match an impedance of the electrode and an impedance of the NFC antenna coil,
   wherein the first data included in the first NFC signal received from the NFC reader through the body by the first communicator is transmitted to the user device by the second communicator.

2. The HBC apparatus of claim 1, further comprising a reception amplifier configured to amplify the first NFC signal received from the NFC reader through the body by the first communicator.

3. The HBC apparatus of claim 1, wherein the second communicator receives, from the user device, second data that is a response to the first data,
   the HBC apparatus further comprises a transmission amplifier configured to amplify a second NFC signal including the second data, and
   the second NFC signal is transmitted to the NFC reader through the body by the first communicator after being amplified by the transmission amplifier.

4. The HBC apparatus of claim 1, wherein
   the first NFC signal received from the NFC reader through the body by the electrode is transmitted to the user NFC device by the NFC antenna coil.

5. The HBC apparatus of claim 4, further comprising a reception amplifier configured to amplify the first NFC signal received from the NFC reader through the body by the electrode,
   wherein the first NFC signal is transmitted to the user NFC device by the NFC antenna coil after being amplified by the reception amplifier.

6. The HBC apparatus of claim 4, further comprising a transmission amplifier configured to amplify a second NFC signal including second data that is a response to the first data received from the user NFC device by the NFC antenna coil,
   wherein the second NFC signal is transmitted to the NFC reader through the body by the electrode after being amplified by the transmission amplifier.

7. The HBC apparatus of claim 4, wherein the user NFC device comprises a reception amplifier configured to amplify the first NFC signal received from the NFC antenna coil.

8. The HBC apparatus of claim 1, wherein
   the second communicator is configured to transmit the first data to the user device according to a non-NFC method.

9. The HBC apparatus of claim 8, wherein the NFC processor comprises a reception amplifier configured to
   amplify the first NFC signal received from the NFC reader through the body by the electrode, and
   extract the first data according to the NFC method from the amplified first NFC signal.

10. The HBC apparatus of claim 8, wherein the second communicator is configured to receive second data that is a response to the first data from the user device according to the non-NFC method, and
    the NFC processor is configured to generate a second NFC signal including the second data according to the NFC method and transmit the second NFC signal to the NFC reader through the body by the electrode.

11. The HBC apparatus of claim 10, wherein the NFC processor comprises a transmission amplifier configured to
    amplify the generated second NFC signal, and
    transmit the amplified second NFC signal to the NFC reader through the body by the electrode.

12. The HBC apparatus of claim 1, wherein the first communicator comprises a first electrode receiving the first NFC signal from the NFC reader through the body in proximity to a first location of the body,
    the second communicator comprises a second electrode transmitting a signal to a user NFC device that is the user device through the body in proximity to a second location of the body, and the first NFC signal received from the NFC reader through the body by the first electrode is transmitted to the user NFC device through the body by the second electrode.

13. The HBC apparatus of claim 12, further comprising a reception amplifier configured to amplify the first NFC signal received from the NFC reader through the body by the first electrode,
wherein the first NFC signal is transmitted to the user NFC device through the body by the second electrode after being amplified by the reception amplifier.

14. The HBC apparatus of claim 12, further comprising a transmission amplifier configured to amplify a second NFC signal including second data that is a response to the first data received from the user NFC device through the body by the second electrode,
wherein the second NFC signal is transmitted to the NFC reader through the body by the first electrode after being amplified by the transmission amplifier.

15. The HBC apparatus of claim 12, wherein the user NFC device comprises a reception amplifier configured to amplify the first NFC signal received from the second electrode through the body.

16. A near field communication (NFC) system comprising:
the HBC apparatus of claim 1; and
the NFC reader,
wherein the NFC reader is configured to:
generate the first NFC signal including the first data; and
transmit the first NFC signal to the HBC apparatus through the body via parasitic capacitance of the NFC antenna coil in proximity to the body.

17. The NFC system of claim 16, wherein the HBC apparatus is configured to transmit a second NFC signal including second data that is a response to the first data to the NFC reader through the body by the first communicator, and
the NFC reader is configured to receive the second NFC signal from the HBC apparatus through the body via the parasitic capacitance of the NFC antenna coil in proximity to the body.

18. The HBC apparatus of claim 1, wherein the second communicator is different the first communicator.

19. An operating method of a human body communication (HBC) apparatus for a near field communication (NFC) signal, the operating method comprising:
receiving, by a first communicator, a first NFC signal from an NFC reader according to an NFC standard through a body by the first communicator approaching the body, wherein the first NFC signal is a signal according to the NFC standard, the first NFC signal propagates along a surface of the body, the first communicator comprises an electrode configured to receive the first NFC signal, and the electrode is plate-shaped electrode that is parallel to the surface of the body;
extracting, by an NFC processor, first data according to an NFC method from the first NFC signal received from the NFC reader through the body;
transmitting, by a second communicator, a signal to a user device, wherein the second communicator comprises an NFC antenna coil configured to transmit the signal to the user device; and
matching, by a matching circuit, an impedance of the electrode and an impedance of the NFC antenna coil,
wherein the first data included in the first NFC signal received from the NFC reader through the body by the first communicator is transmitted to the user device by the second communicator.

* * * * *